(12) United States Patent
Hironaka et al.

(10) Patent No.: US 6,856,872 B2
(45) Date of Patent: Feb. 15, 2005

(54) CONTROL METHOD FOR ELECTRIC POWER STEERING APPARATUS

(75) Inventors: Shinji Hironaka, Wako (JP); Hiroyuki Koibuchi, Wako (JP); Akihiro Tamaki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/391,057

(22) Filed: Mar. 17, 2003

(65) Prior Publication Data

US 2004/0186641 A1 Sep. 23, 2004

(51) Int. Cl.$^7$ .............................................. B62D 12/00
(52) U.S. Cl. ............................ 701/42; 701/43; 180/443
(58) Field of Search ...................... 701/42, 41; 180/443, 180/446; 318/253, 599, 811

(56) References Cited

U.S. PATENT DOCUMENTS 5,844,387 A * 12/1998 Mukai et al. ................ 318/432
2002/0022914 A1 * 2/2002 Kawada et al. ............... 701/41

* cited by examiner

Primary Examiner—Marthe Y. Marc-Coleman
(74) Attorney, Agent, or Firm—Merchant & Gould P.C.

(57) ABSTRACT

Control method for an electric power steering apparatus feeds back a motor current, flowing through a motor whose operation is controlled in accordance with a target motor current, so that the driving of the motor is controlled with the fed-back motor current. Peak value of the motor current is detected, and, for feedback control based on the detected peak value, the detected peak value is corrected to decrease. The thus-corrected peak value is fed back to control the motor current to conform to a target motor current value.

7 Claims, 12 Drawing Sheets

CONTROL METHOD FOR ELECTRIC POWER STEERING APPARATUS

FIELD OF THE INVENTION

The present invention relates generally to methods for controlling electric power steering apparatus which inpart power of an electric motor to a vehicle steering system to thereby reduce necessary manual steering force.

BACKGROUND OF THE INVENTION

Figure 8:
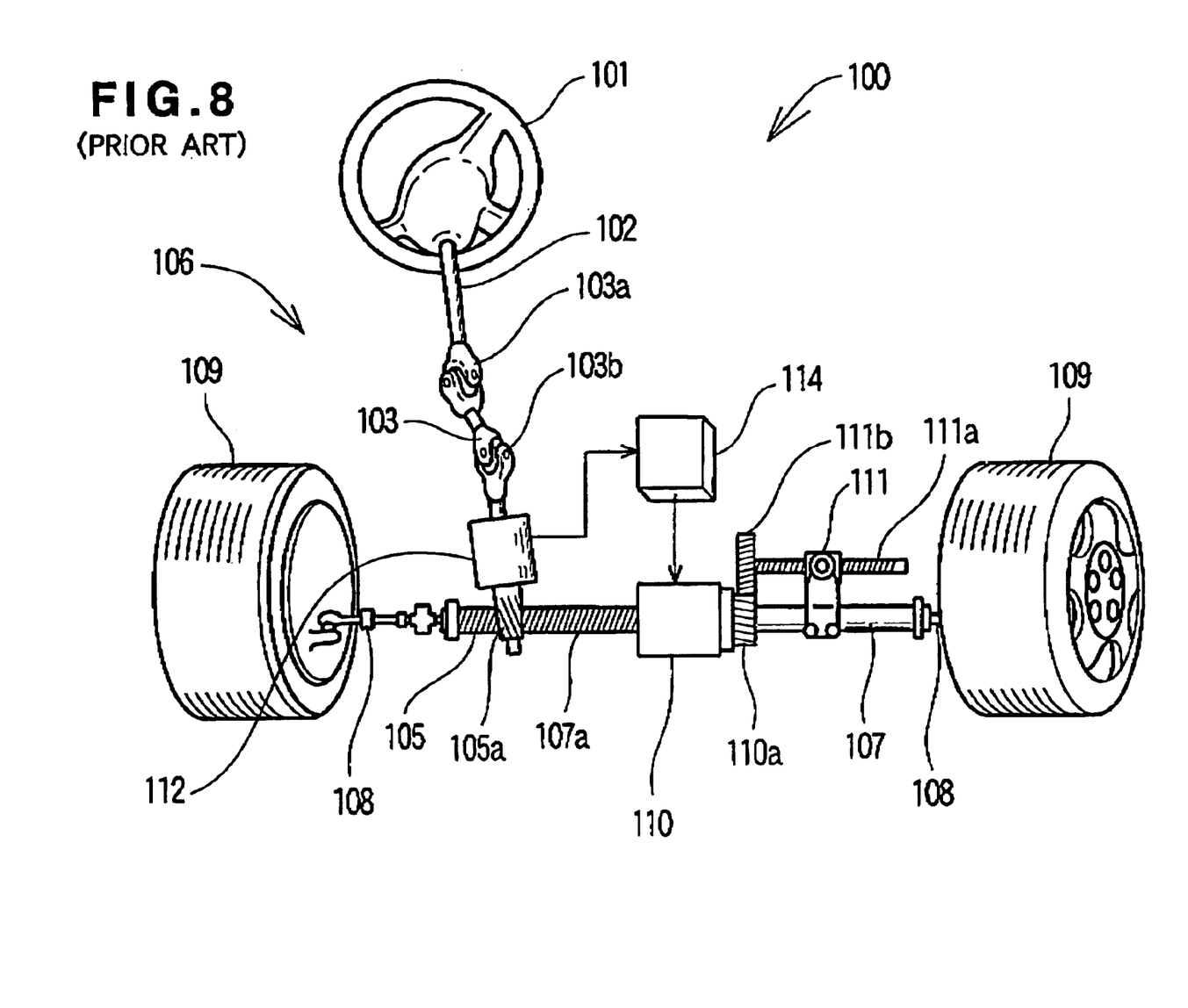
FIG. 8 is a schematic view showing a general setup of a conventional electric power steering apparatus.

FIG. 8 hereof schematically illustrates a general setup of a conventional electric power steering apparatus 100 suitable for application to a motor vehicle. The conventional electric power steering apparatus 100 includes a steering wheel 101, a steering shaft 102 connected integrally to the steering wheel 101, a manual steering torque generation mechanism 106 provided on the steering shaft 102, and a rack and pinion mechanism 105 having a pinion 105a coupled to the manual steering torque generation mechanism 106 via a connecting shaft 103 having universal joints 103a and 103b. The rack and pinion mechanism 105 includes a rack shaft 107 having a rack tooth 107a meshing with the pinion 105, and the rack shaft 107 can axially reciprocate via the meshing engagement between the rack teeth 107a and the pinion 105. Left and right front wheels 109, constructed as steerable wheels of the vehicle, are coupled via tie rods 108 to the opposite ends of the rack shaft 107. Human operator or driver of the vehicle operates the steering wheel 101 to steer the steerable front wheels 109 by way of the manual steering torque generation mechanism 106 and rack shaft 107.

To reduce manual steering torque to be generated via the manual steering torque generation mechanism 106, an electric motor 110 for supplying steering assist torque is provided, for example, coaxially with the rack shaft 107. Rotational force supplied as the Steering assist torque by the motor 110 is converted into linear force via a ball thread mechanism 111 provided substantially parallel to the rack shaft 107, which is applied to the rack shaft 107. Rotor of the steering assisting motor 110 has a helical driving gear 110a provided integrally thereon and meshing with a helical gear 111b provided integrally on an end of a threaded shaft 111a of the ball thread mechanism 111. The ball thread mechanism 111 has a nut operatively coupled to the rack shaft 107.

Figure 9:
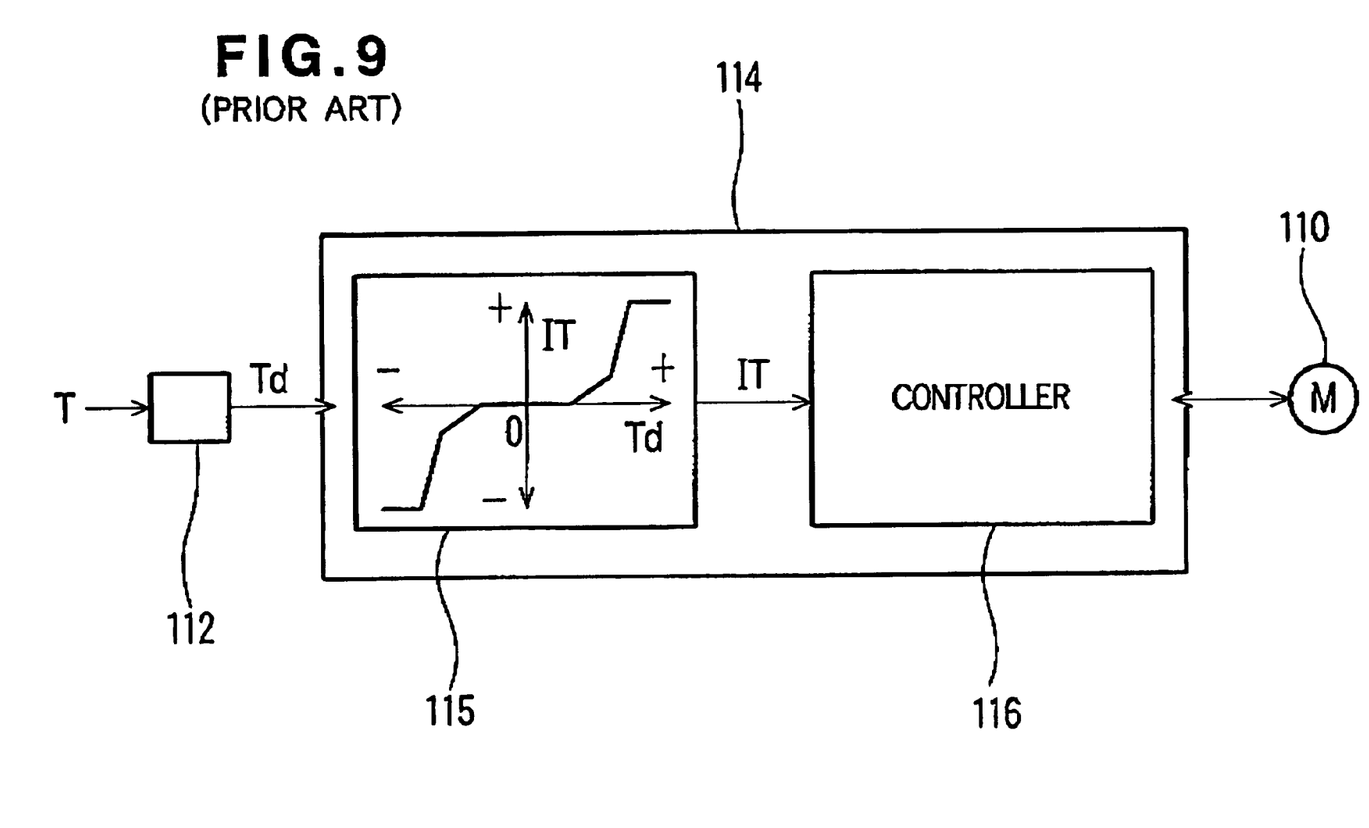
FIG. 9 is a block diagram showing a control device employed in the electric power steering apparatus of FIG. 8.

FIG. 9 hereof is a block diagram showing a control device employed in the conventional electric power steering apparatus 100. Within a steering gearbox (not shown in FIG. 8), there is provided a manual steering torque detector section 112 for detecting manual steering torque T acting on the pinion 105a. The manual steering torque detector section 112 converts the detected manual steering torque T into a manual steering torque detection signal Td and delivers the thus-converted manual steering torque detection signal Td to the control device 114. Using the manual steering torque detection signal Td as a primary motor-operating signal, the control device 114 operates the steering assisting motor 110 and controls steering assist torque to be produced by the motor 110. The control device 114 includes a target current setting section 115 and a controller 116. The target current setting section 115 sets target assisting torque on the basis of the manual steering torque detection signal Td and generates a target motor current signal IT necessary for the motor 110 to produce the target assisting torque.

Figure 10:
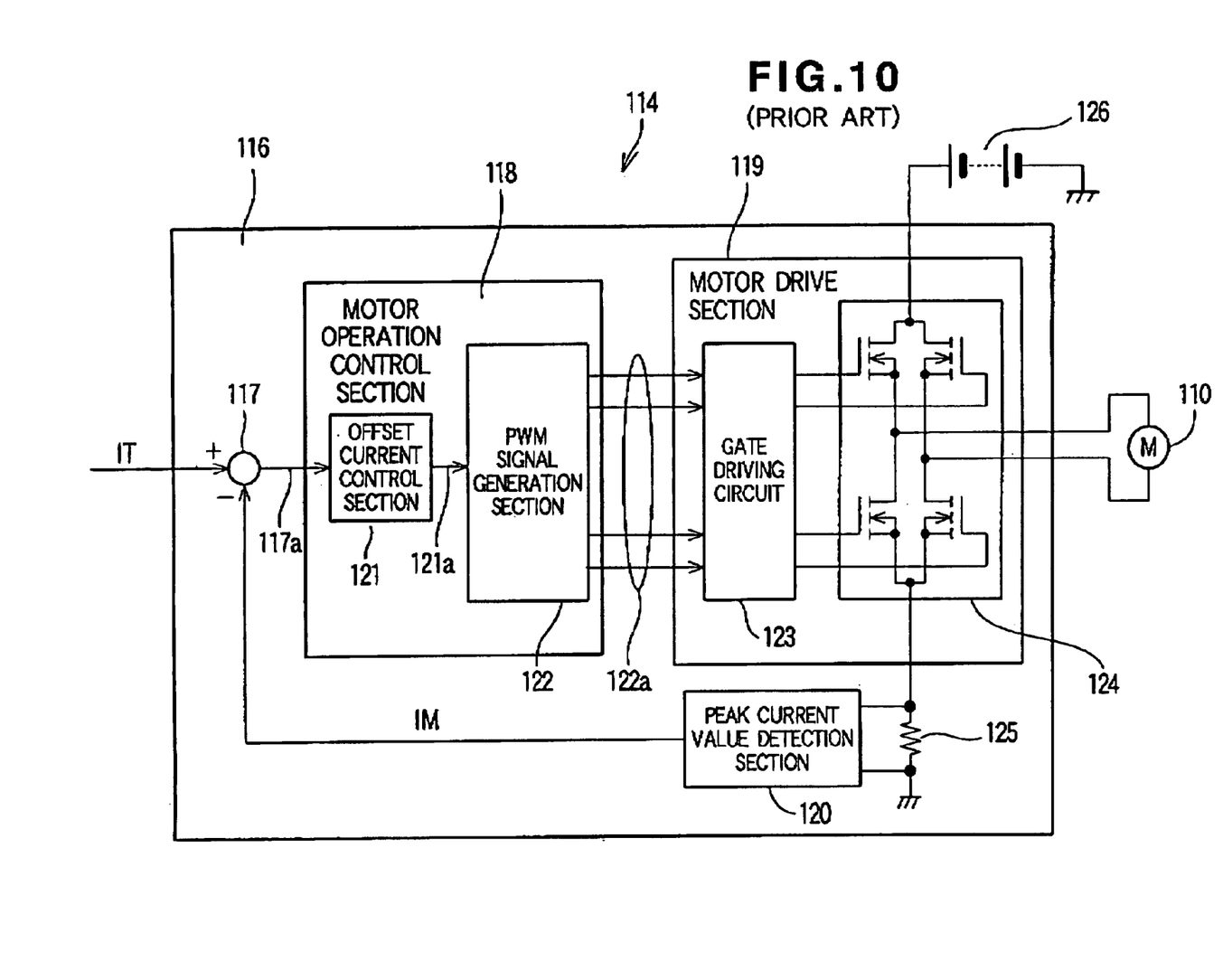
FIG. 10 is a block diagram showing detailed structure of a controller shown in FIG. 9.

FIG. 10 is a block diagram showing detailed structure of the controller 116 of FIG. 9. As shown, the control section 116 includes an offset calculation section 117, a motor operation control section 118, a motor drive section 119, and a peak current value detection section 120. The offset calculation section 117 calculates an offset value between the target motor current signal IT output from the target current setting section 115 of FIG. 9 and a peak current signal IM output from the peak current value detection section 120, and it outputs an offset signal 117a indicative of the calculated offset value. The motor operation control section 118 includes an offset current control section 121 and a PWM (Pulse Width Modulated) signal generation section 122. The offset current control section 121 performs processing, such as proportional, integral and differential (PID) operations, on the offset signal 117a supplied from the offset calculation section 117 and thereby generates a driving current signal 121a for controlling the motor current to be supplied to the motor 110 in such a manner that the offset signal 117a approaches an ideal zero value. The PWM signal generation section 122 generates a PWM signal for PWM-operating the motor 110 on the basis of the driving current signal 121a and outputs the thus-generated PWM signal as a drive control signal 122a.

Further, in the controller 116, the motor drive section 119 includes a gate-driving circuit section 123, and a motor drive circuit section 124 having four powering FETs (Filed Effect Transistors) interconnected via an H-shaped bridge circuit. The gate-driving circuit section 123 selects two of the four FETs on the basis of the drive control signal (PWM signal) 122a and in accordance with a current steering direction of the steering wheel 101, and it drives the gates of the selected two FETs to allow these FETs to perform a switching operation. The peak current value detection section 120 detects a peak value of the motor current (armature current) flowing through the steering assisting motor 110 and outputs a peak current signal IM. In the manner set forth above, the control device 114 PWM-controls the current to be supplied from a battery power supply 126 to the motor 110 and thereby controls the output power (steering assist torque) of the motor 110, on the basis of the manual steering torque T detected via the manual steering torque detector section 112 of FIG. 9.

As seen in FIG. 10, the control device 114 achieves enhanced control characteristics of the motor 110 by the controller 116 detecting the peak value of the motor current actually flowing through the motor 110 and performing feedback control of the motor current based on the peak current signal IM. In the aforementioned manner, the manual steering torque T applied by the vehicle driver is detected via the manual steering torque detector section 112 of the manual steering torque generation mechanism 106 shown in FIG. 8, and the control device 114 controls the output power of the motor 110, on the basis of the detected manual steering torque T, so as to assist the rack shaft 107 in the steering gearbox in moving linearly for desired steerage.

Control method performed by the conventional control device 114 is explained below. As illustrated in FIG. 10, the steering assisting motor 110 is driven on the basis of feedback control of the motor current performed by the control device 114. Then, the motor current flowing through the motor 110 when two diagonally-opposed FETs, among the four FETs interconnected by the H-shaped bridge circuit, are in the ON state is detected by the peak current value detection section 120.

Figure 11:
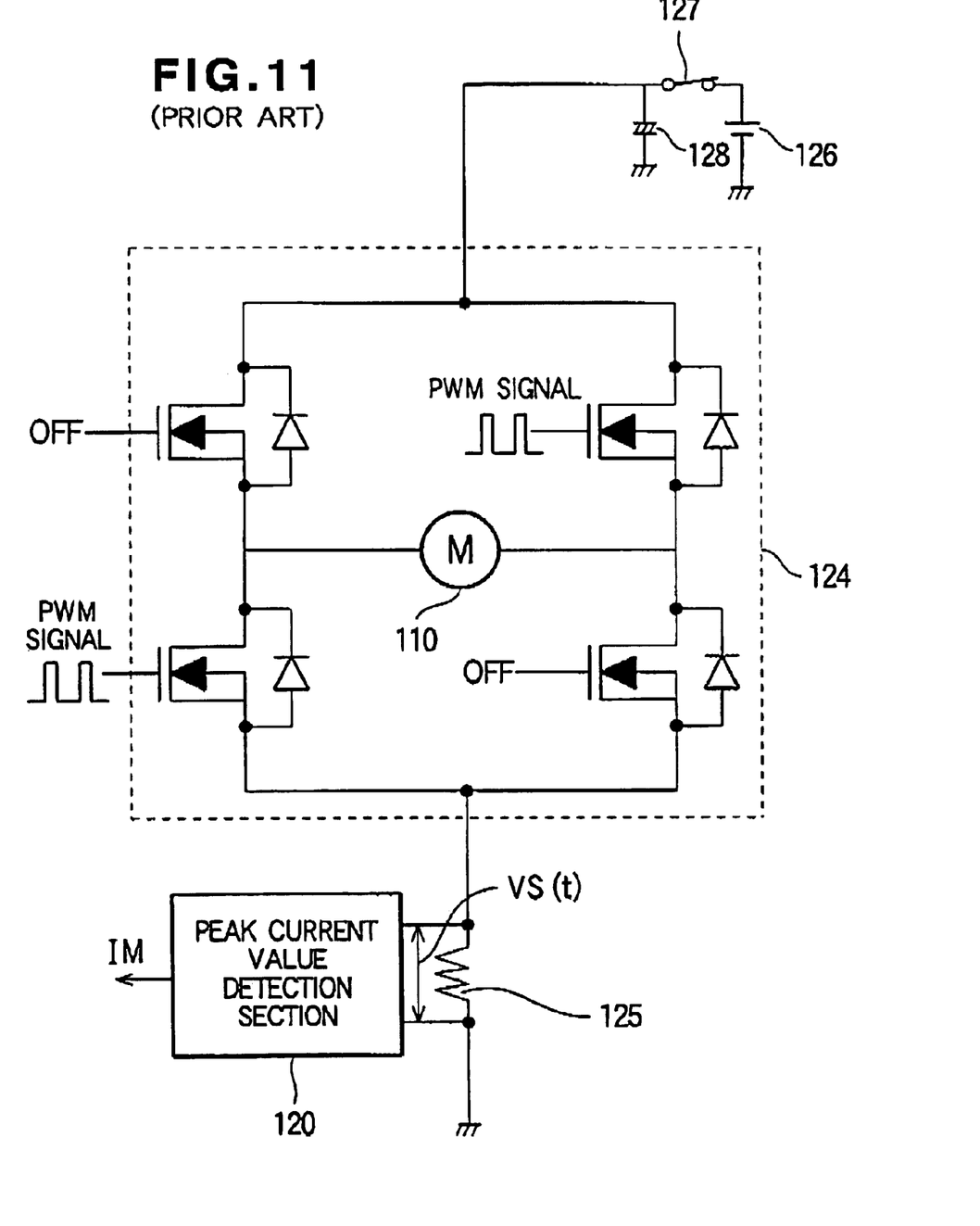
FIG. 11 is a block diagram showing a peak current detection section, motor drive circuit, steering assisting motor and battery power supply in the controller of FIG. 10.

FIG. 11 is a block diagram showing the peak current value detection section 120, motor drive circuit 124, steering assisting motor 110 and battery 126. The peak current value detection section 120 generates the peak current signal IM on the basis of a voltage VS(t) across both ends of a shunt resistor 125 connected in series with the motor drive circuit 124. The peak current value detection section 120 includes a peak holding circuit for holding a peak value VP of the voltage VS(t) input thereto. The peak current signal IM output from the peak current value detection section 120 represents a peak value of the motor current (detected peak current value) ISP. Switch 127 is kept in a closed state during operation of the vehicle, so that voltage of the battery 126 is applied to a capacitor 128. The capacitor 128 is provided to stabilize the battery voltage to be fed to the motor drive circuit 124. The peak current value ISP (peak current signal IM) detected by the peak current value detection section 120 is fed back to the offset calculation section 117 for calculation of an offset between the target motor current signal IT and the peak current value ISP, and the driving of the motor 110 is controlled so that the offset is minimized to zero.

With the electric power steering apparatus where the feedback control is performed using the peak-holding-type peak current value detection section 120, there would arise the following inconveniences.

In the peak current value detection section 120 using the peak holding circuit to perform the current detection, the peak value is detected from the motor current varying in response to a duty cycle of the PWM signal. Thus, when the duty cycle of the PWM signal is smaller than 50% so that the motor current takes a small value, a difference between an average value of the actual motor current and the detected peak current value would become considerably great. The following paragraphs set fourth relationship between the duty cycle of the PWM signal and the detected peak current value and inconveniences arising from the relationship.

Figure 12:
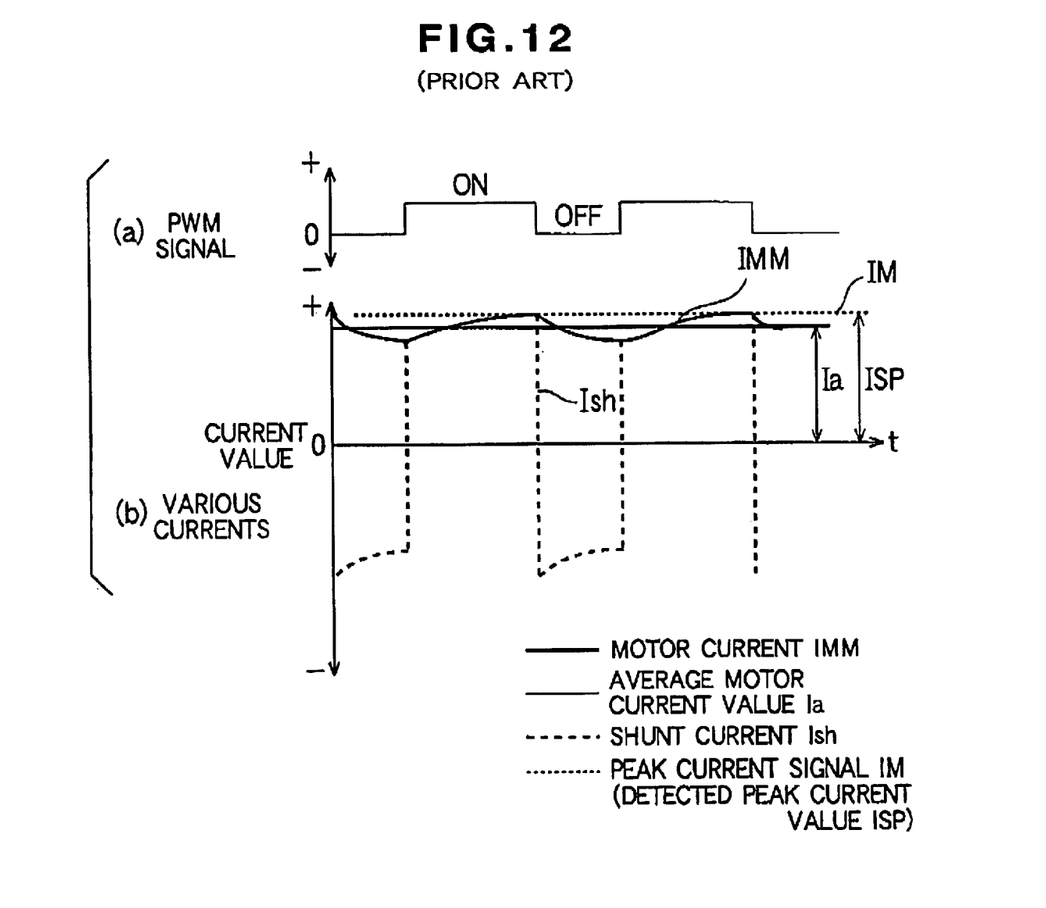
FIG. 12 is a timing chart showing variations over time of a PWM signal and various current values in the conventional apparatus.
Figure 13:
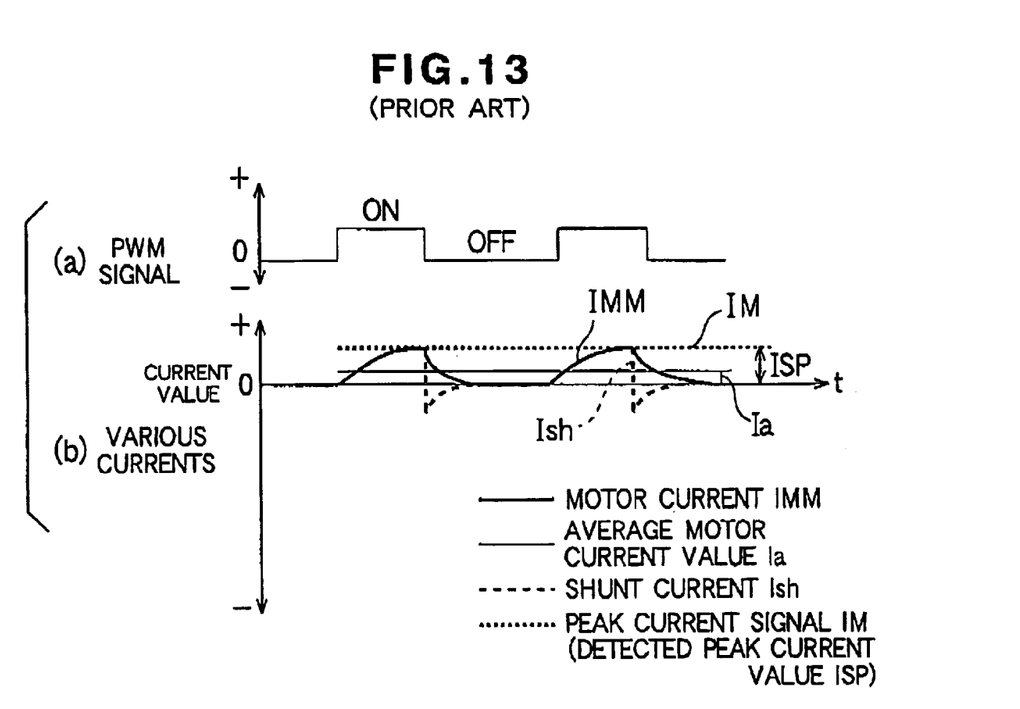
FIG. 13 is a timing chart showing variations over time of the PWM signal and various current values in the conventional apparatus.

FIGS. 12 and 13 are timing charts each illustrating variations over time of various current values (i.e., value of the motor current, average value of the motor current, shunt current value and detected peak current value) relative to the PWM signal. Specifically, FIG. 12 shows a timing chart when the duty cycle of the PWM signal is greater than 50% and the motor current is relatively great. More specifically, section (a) of FIG. 12 shows a variation over time of the PWM signal 122a output from the PWM signal generation section 122, and section (b) of FIG. 12 shows variations over time of the motor current IMM flowing through the motor 110, average value Ia of the motor current, shunt current Ish and peak current IM detected by the peak current value detection section 120 (detected peak current value ISP). In this case, a ratio of the peak value of the motor current (i.e., detected peak current value ISP) to the average value Ia of the motor current, namely, ISP/Ia, is very close to a value "1"; that is, the average value Ia and of the motor current and the detected peak current value ISP are close to each other.

FIG. 13 shows variations over time of the various current values when the duty cycle of the PWM signal is less than 50% and the motor current is relatively small. Specifically, section (a) of FIG. 13 shows a variation over time of the PM signal 122a output from the PWM signal generation section 122, and section (b) of FIG. 13 shows variations over time of the motor current IMM flowing through the motor 110, average value Ia of the motor current IMM, shunt current Ish and peak current IM detected by the peak current value detection section 120 (detected peak current value ISP). In this case, the ratio, to the average value Ia of the motor current, of the peak value of the motor current (i.e., detected peak current value ISP), namely, ISP/Ia, is considerably greater than the value "1"; that is, the average value Ia and of the motor current and the detected peak current value ISP are greatly different from to each other. In this case, the detected peak current value ISP to be used for the feedback control, greatly differing from the average value Ia of the motor current, would prevent optimal feedback control of the motor current.

Figure 14:
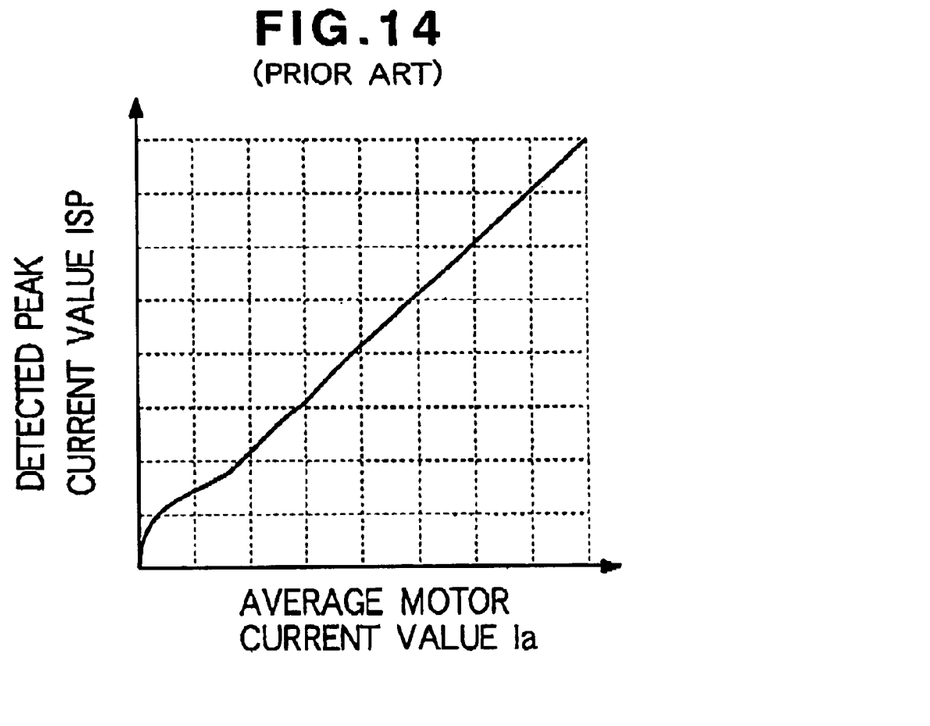
FIG. 14 is a graph showing characteristics of a detected peak current value relative to an average value of a motor current.
Figure 15:
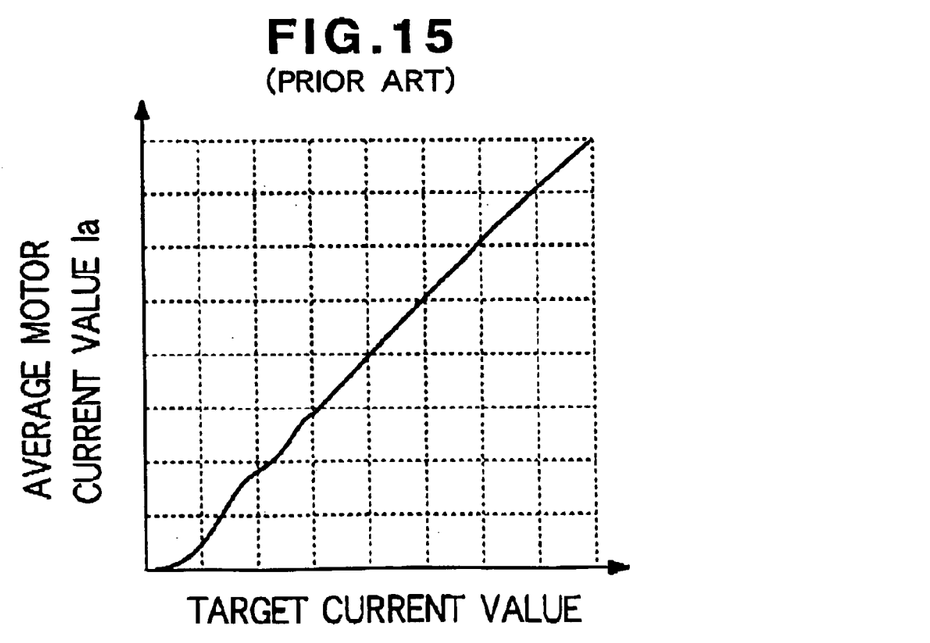
FIG. 15 is a graph showing characteristics of a motor current relative to a target motor current when the motor current is controlled in accordance with a conventional control method.

FIG. 14 is a graph showing characteristics of the detected peak current value ISP relative to the average value Ia of the motor current, where the horizontal axis represents the average value Ia while the vertical axis represents the detected peak current value ISP. As shown, when the average value Ia of the motor current is small, the ratio ISP/Ia is greater than the value "1", presenting a nonlinear characteristic. Therefore, according to the conventional control method performed by the control device 114 based on the feedback control using the peak-holding-type peak current value detection section 120, there are obtained actual control characteristics as illustratively shown in FIG. 15. In FIG. 15, the horizontal axis represents the target motor current signal IT, while the vertical axis represents the average value Ia of the motor current. From FIG. 15, it is seen that the average motor current value Ia becomes smaller than the value of the target motor current signal IT without coinciding with the latter. Therefore, at the beginning of turning, by the vehicle driver, of the steering wheel, when the target motor signal IT is set at a small value (i.e., a small value range), the average value Ia of the motor current would come short of a predetermined value so that the motor current can not be output as designated by the target motor signal IT, as a result of which a desired steering feel can not be attained.

Namely, with the conventional control device 114 where the peak motor current, i.e. the detected peak current value ISP, is ted back by the peak current value detection section 120 for the motor current control, there would arise the problem that, when the target motor current signal is set at a small value (i.e., a small value range), the actual steering assisting current (average motor current value) would become smaller than the target steering assisting current (target average motor current value), undesirably providing insufficient torque assist.

SUMMARY OF THE INVENTION

In view of the foregoing prior art problems, it is an object of the present invention to provide a motor operation control method for an electric power steering apparatus which, even when a target motor current signal is set at a small value, can minimize a difference between actual and target steering assisting motor currents and thereby achieve a sufficient steering assist.

SUMMARY OF THE INVENTION

In order to accomplish the above-mentioned object, the present invention provides a control method for an electric power steering apparatus, which comprises the steps of: detecting a peak value of a motor current flowing through a steering assisting motor whose operation is controlled on the basis of a PWM signal generated in accordance with a target motor current signal; correcting the detected peak value; and performing feedback control of the motor current on the basis of the corrected peak value.

According to the control method of the present invention, the peak value of the motor current (i.e., detected peak current value) is corrected so that the corrected peak current value is used for feedback control of the motor current. Thus, the motor current can be controlled using, as a feedback value, the corrected peak value that is close to an average value of the motor current. Therefore, the steering assisting current of a small value, e.g. the steering assisting current at the beginning of slow turning of the steering wheel during straight travel of the vehicle, can be controlled appropriately in accordance with a desired target motor current, so that an assisted steering feel of a vehicle driver can be enhanced significantly.

It is preferable that the correcting step correct the detected peak current value to a smaller value. For example, the correction of the detected peak current value may be performed on the basis of a current correction table. More specifically, the current correction table is searched for a current correcting amount corresponding to the detected peak current value, and the detected peak current value is corrected through an arithmetic operation to subtract therefrom the current correcting amount. In the case where the correction of the detected peak current value is performed on the basis of the current correction table, the corrected peak current value can become an optimal value to be used for the feedback control of the motor current, which thereby permits optimal feedback control of the motor current. It is also preferable that the current correction table be prepared on the basis of relationship between various average values of the motor current flowing through the steering assisting motor and various detected peak current values of the motor current, because, in this case, the corrected peak current value can become an optimal value to permit optimal feedback control of the motor current.

Further, according to a preferred embodiment of the present invention, the correction of the detected peak current value is preferably carried out only when the target motor current signal is set at a small value (i.e., a small value range) such that a ratio of the detected peak current value to the average value of the motor current flowing through the steering assisting motor exceeds a predetermined value. Namely, in this case, the correction of the detected peak current value is performed only when necessary, so that appropriate correction of the detected peak current value and hence optimal feedback control of the motor current is achieved by the present invention.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

General structure of an electric power steering apparatus to be controlled by a control method of the present invention is basically the same as described earlier in relation to the conventional electric power steering apparatus FIG. 8.

Figure 1:
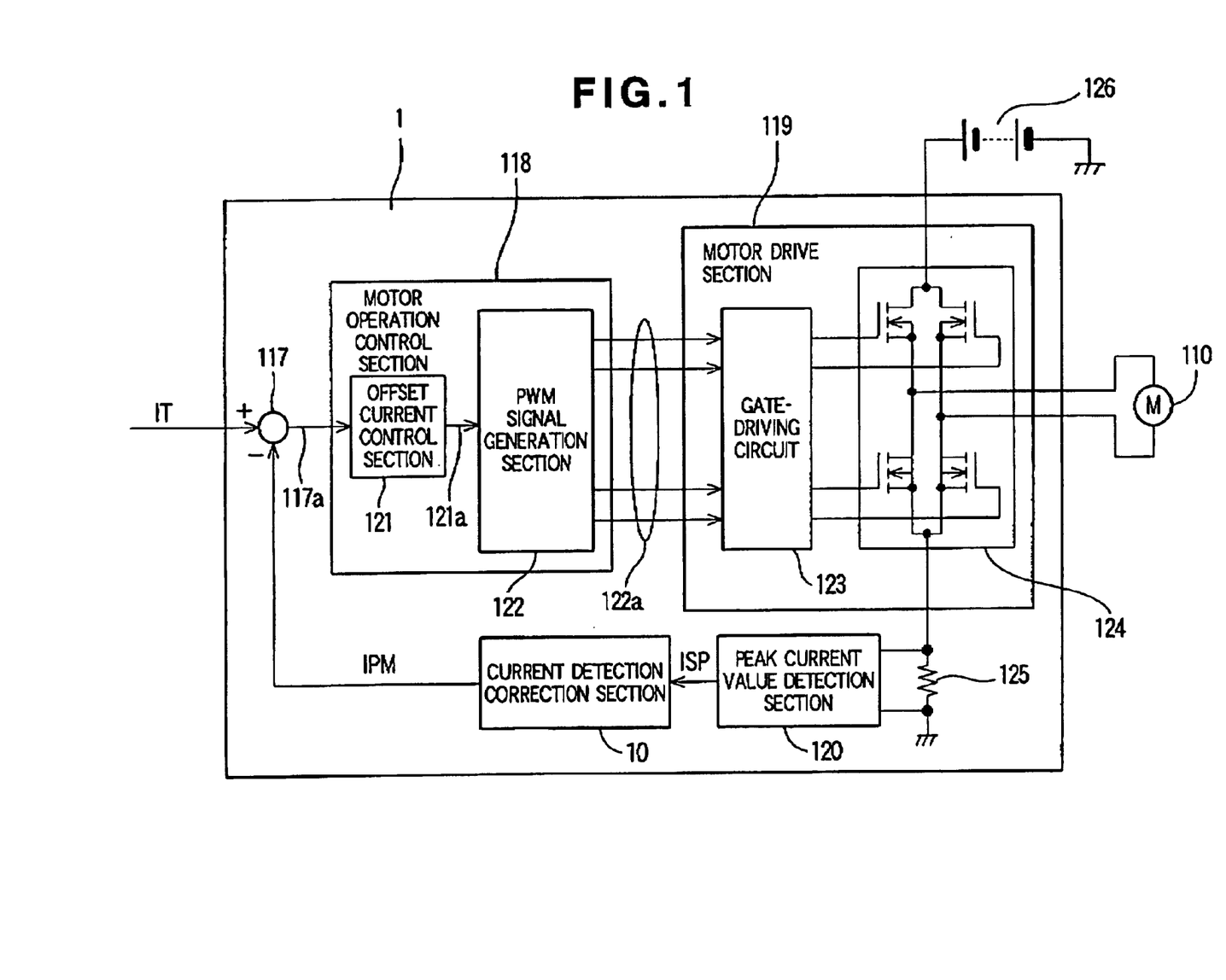
FIG. 1 is a block diagram showing a general set up of a controller employed in a control device for performing a control method of the present invention.

FIG. 1 is a block diagram showing a general set up of a controller 1 employed in a control device for performing the control method of the present invention that is intended to control operation of a steering assisting motor of an electric power steering apparatus. Briefly stated, the controller 1 of the electric power steering apparatus shown in FIG. 1 is characterized by including a current detection correcting section 10 in addition to the components of the controller 116 employed in the conventional control device 114 shown in FIGS. 9 and 10.

The current detection correcting section 10 subtractively corrects a detected peak current value ISP supplied from a peak current value detection section 120, to thereby output a corrected current value IPM. The corrected current value IPM is delivered to an offset calculation section 117 to he used for feedback control.

Figure 2:
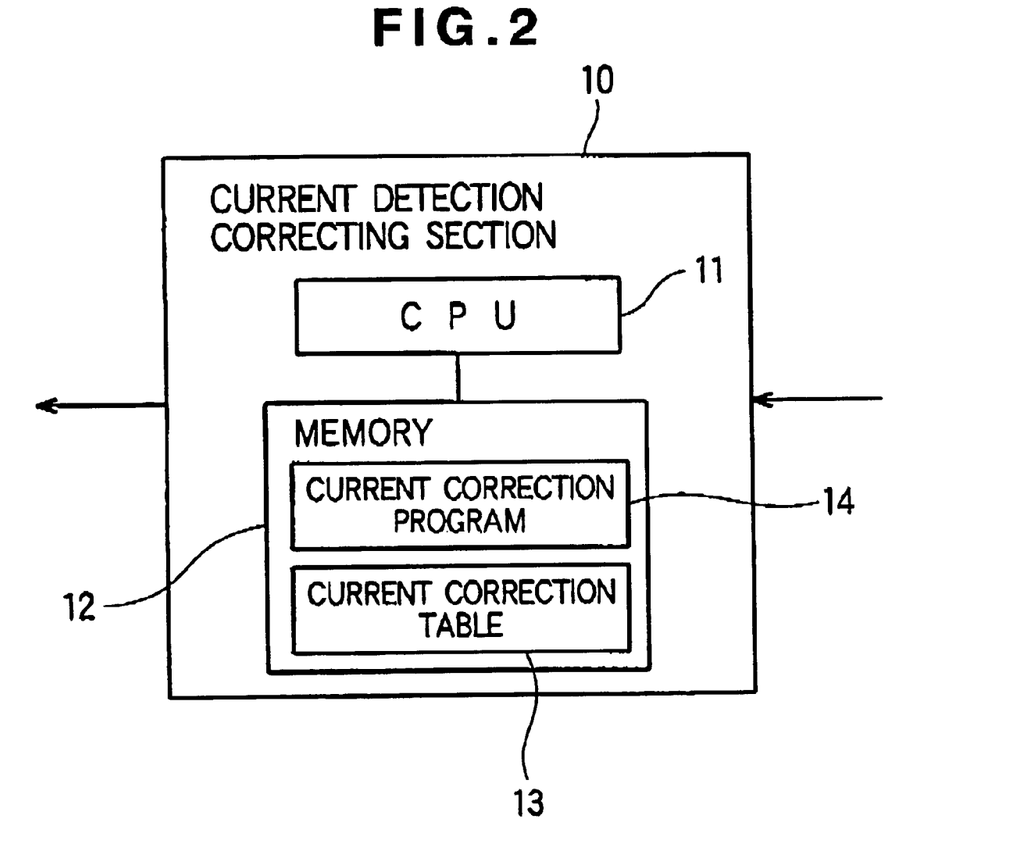
FIG. 2 is a block diagram showing a first specific example of a current detection correcting section shown in FIG. 1.

FIG. 2 is a block diagram showing a first specific example of the current detection correcting section 10. This current detection correcting section 10 includes a CPU 11, and a memory 12 where are prestored a current correction table 13 and current correction program 14.

Figure 3:
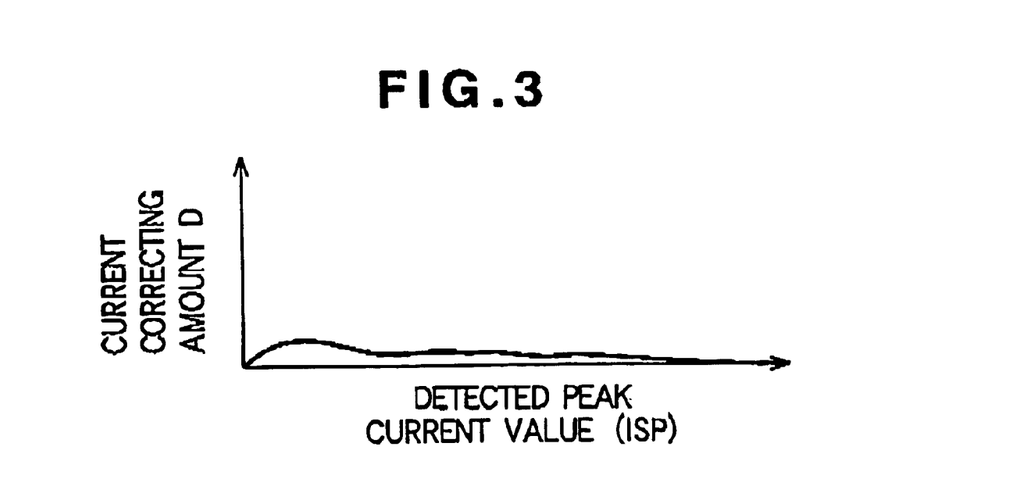
FIG. 3 is a graph explanatory of a table indicating relationship between detected peak current values and current correcting amounts.

The current correction table 13 prestored in the memory 12 is a lookup table prepared on the basis of a graph that represents relationship of various average motor current values Ia to various detected peak current values ISP output from the peak current value detection section 120 (FIG. 1). More specifically, the current correction table 13 represents correspondency between various detected peak current values ISP and current correcting amounts D. For example, the current correction table 13 is prepared by calculating differences of the individual detected peak current values ISP from the corresponding average motor current value Ia as illustrated in the graph of FIG. 14 and then setting the thus-calculated differences as the current correcting amounts D. FIG. 3 is a graph explanatory of the current correction table 13 that defines the current correcting amounts D corresponding to the various detected peak current values ISP.

Figure 4:
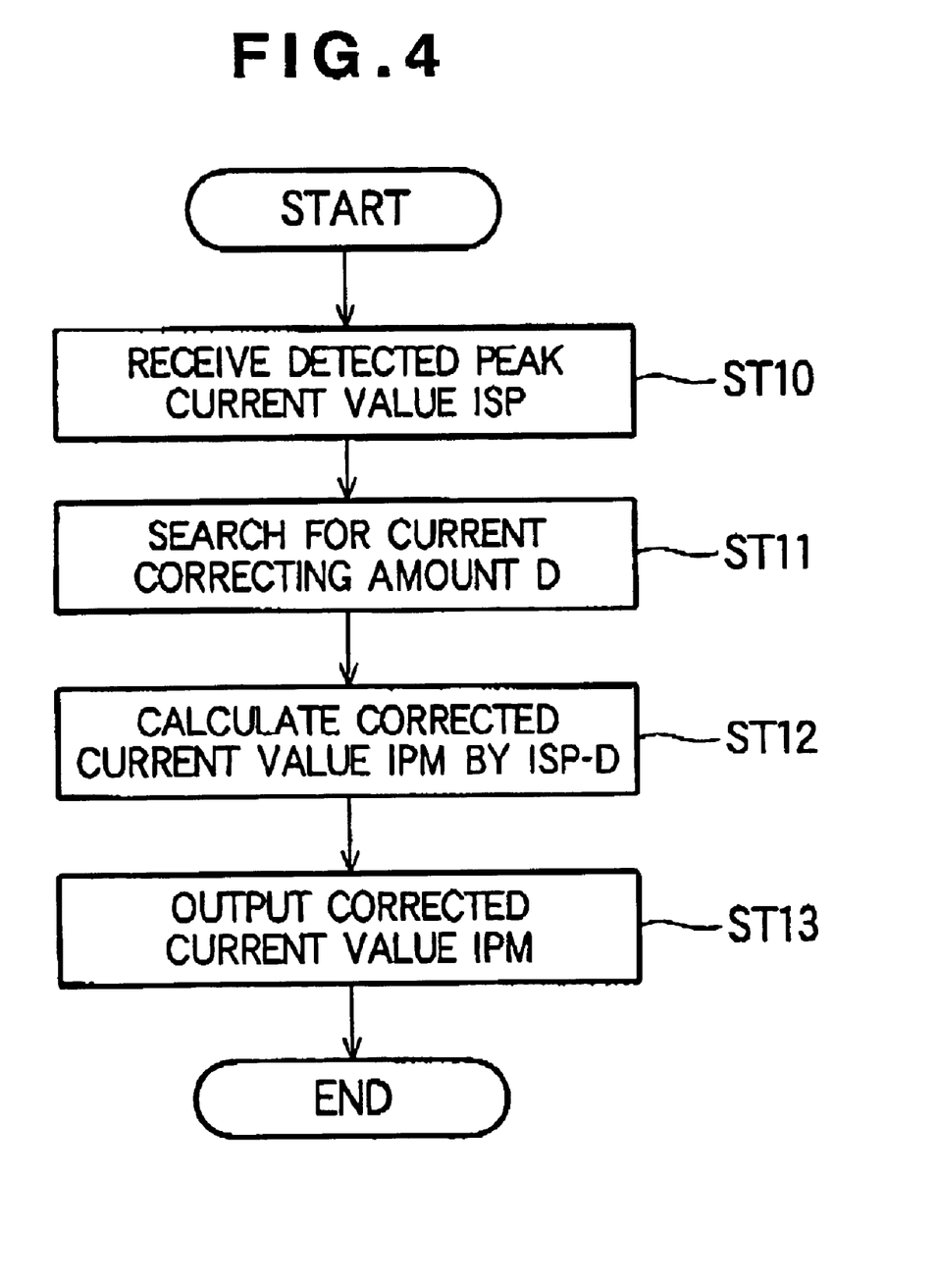
FIG. 4 is a flow chart of a current correction program that operates the current detection correcting section shown in FIG. 2.

The current correction program 14 also prestored in the memory 12 is constructed to calculate a corrected current value IPM from the detected peak current value ISP, as flowcharted in FIG. 4. Once a detected peak current value ISP is input from the peak current value detection section 120 to the current detection correcting section 10 at step ST10, the CPU 11 searches the current correction table 13 for a current correcting amount D corresponding to the input detected peak current value ISP at step ST11. Then, the CPU 11 proceeds to step ST12 in order to perform an arithmetic operation, as indicated in Expression (1) below, to determine a corrected current value IPM.

$$IPM=ISP-D \quad (1)$$

Then, the CPU 11 outputs the thus-calculated corrected current value IPM at step ST13.

Next, a description will be given about the control method performed by the control device that includes the controller 1 shown in FIG. 1. The offset calculation section 117 of FIG. 1 calculates an offset value between a target motor current signal IT output from a target current setting section 115 similar to the target current setting section 115 of FIG. 9 and the corrected current value IPM output from the current detection correcting section 10, and it outputs an offset signal 117b indicative of the calculated offset value. Motor operation control section 118, having received the offset signal 117b, generates a drive control signal (PWM signal) 122a and outputs the drive control signal 122a to a motor drive section 119 as in the conventional control device of FIG. 10. Thus, the motor drive section 119 drives a steering assisting motor 110 in the same manner as in the conventional control device of FIG. 10.

Motor current thus caused to flow through the steering assisting motor 110 is detected by the peak-holding-type peak current value detection section 120 shown in FIG. 1. Peak current value ISP detected by the peak current value detection section 120 is passed to the current detection correcting section 10. Once the detected peak current value ISP has been received, the current detection correcting section 10 operates in accordance with the current correction program 14. Namely, the CPU 11 determines and outputs a corrected current value IPM by searching the current correction table 13, stored in the memory 12, for a particular current correcting amount D corresponding to the received detected peak current value ISP and then executing the arithmetic operation indicated by Mathematical Expression (1).

After that, the corrected current value IPM is fed to the offset calculation section 117 that calculates an offset of the corrected current value IPM from the value of the target motor current signal IT. Then, the controller 1 supplies the motor drive section 119 with an ultimate output signal (motor drive signal) such that the offset is minimized, in a similar manner to the conventional controller 116. The above-described arrangements achieve linear current output characteristics relative to the target motor current.

Figure 5:
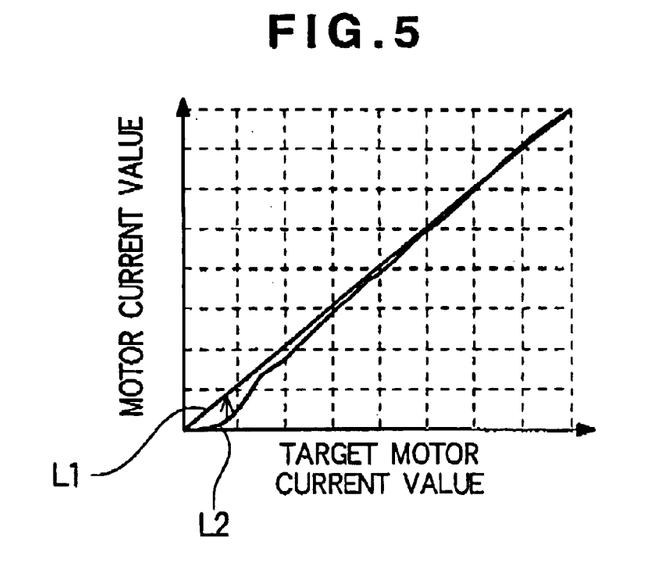
FIG. 5 is a graph showing characteristics of a motor current relative to a target motor current when the motor current is controlled in accordance with the control method of the present invention.

Reference numeral L1 in FIG. 5 represents a curve of control characteristics, i.e. characteristics of the motor current relative to the target motor current, detected when the control method of the present invention is applied. In this figure, the horizontal axis represents the target motor current value, while the vertical axis represents the average motor current value. From the curve L1, it can be seen that the inventive control method can achieve linear current output characteristics relative to the target motor current value. Reference numeral L2 represents control characteristics when the conventional control method is applied, for purposes of comparison.

Because the control method of the present invention linear current output characteristics relative to the target motor current value as noted above, it is possible to set a desired steering assist at an initial manual steering stage when the vehicle driver has just started turning the steering wheel.

Figure 6:
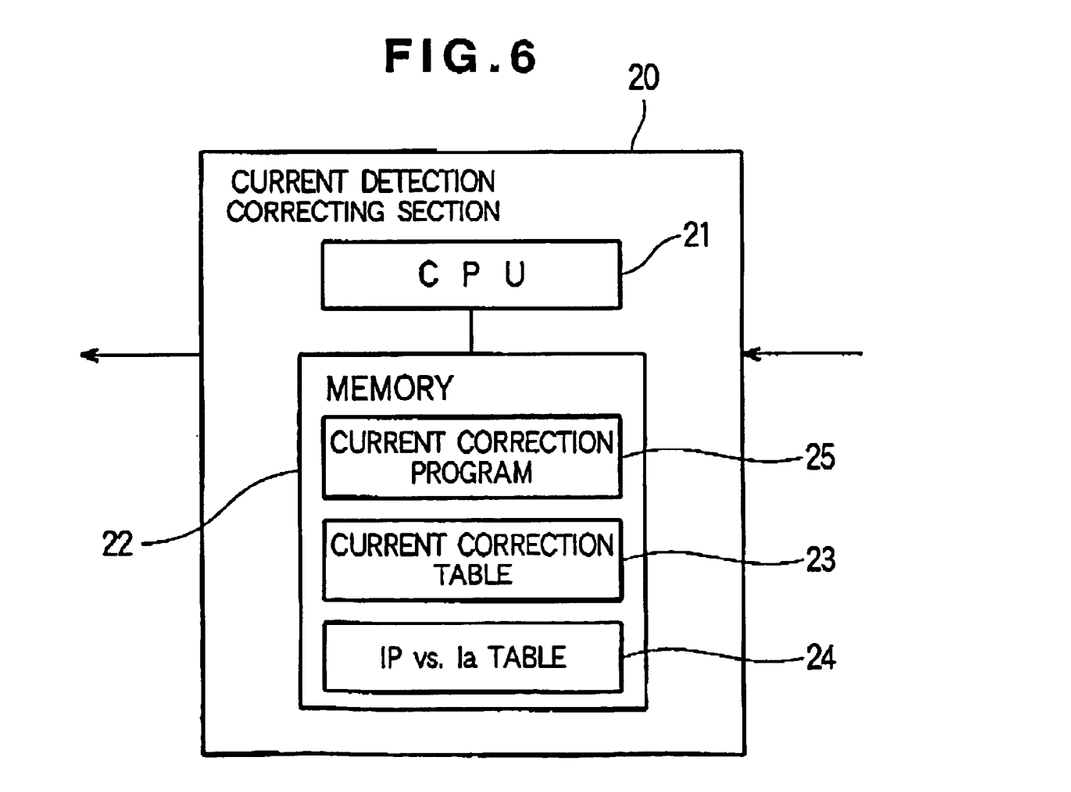
FIG. 6 is a block diagram showing a second specific example of the current detection correcting section.

FIG. 6 is a block diagram showing a second specific example of the current detection correcting section, which is generally denoted by reference numeral 20. The second specific example 20 is constructed to subtractively correct the detected peak current only when the target motor current is set at a small value (i.e., a small value range) such that the ratio, to the average value Ia of the current flowing through the motor 110, of the detected peak current value ISP exceeds a predetermined value, so that the thus-corrected current value ISP is used for the feedback control.

The current detection correcting section 20 includes a CPU 21, and a memory 22 where are prestored a current correction table 23, peak-current-value vs. average-current-value table 24 and current correction program 25. The current correction table 23 is similar to the current correction table 13 employed in the current detection correcting section 10 of FIG. 2. The peak-current-value vs. average-current-value table 24 is a lookup table storing various average motor current values Ia corresponding to various detected peak current values ISP output from the peak current value detection section 120.

Figure 7:
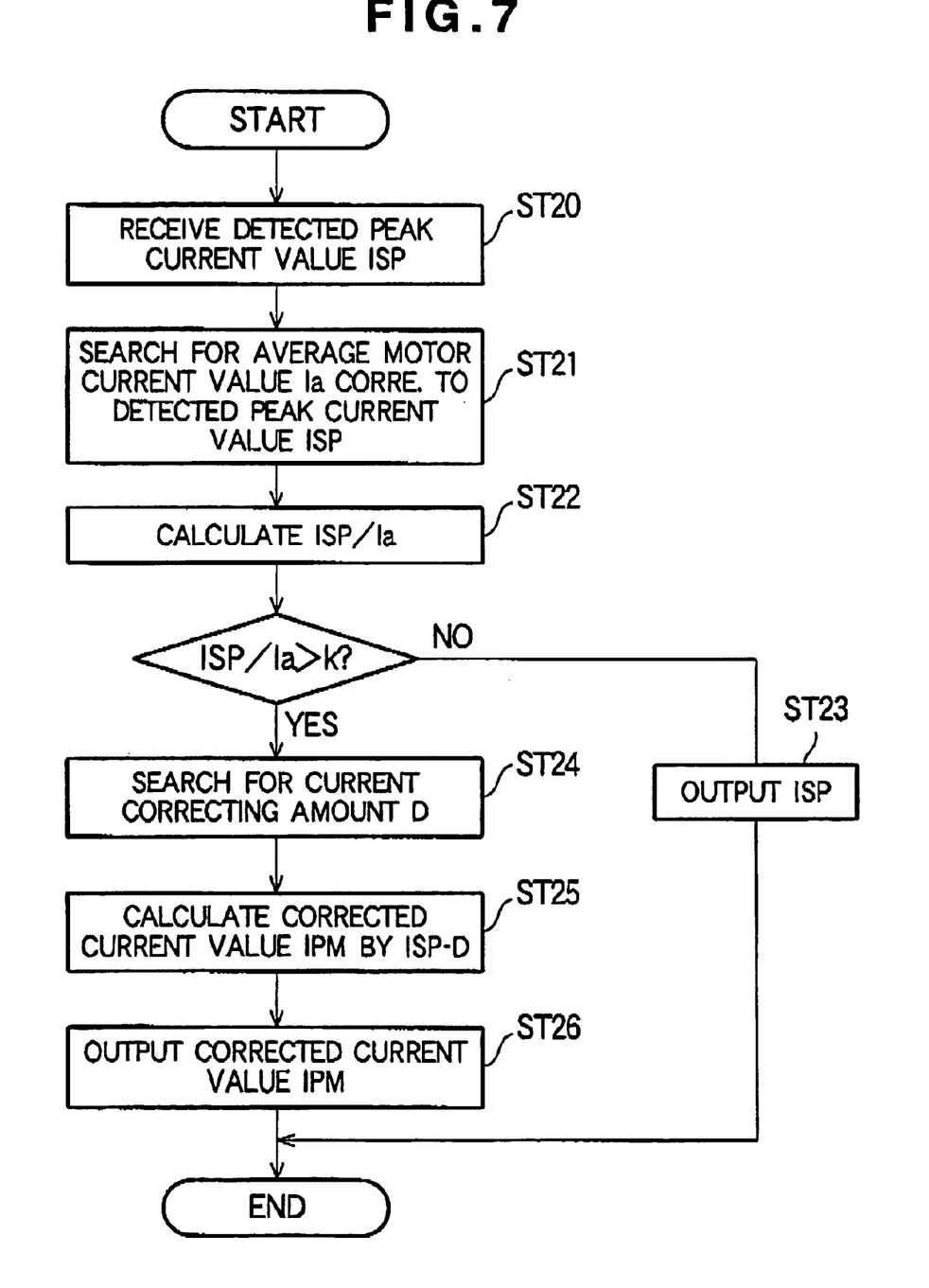
FIG. 7 is a flow chart of a current correction program that operates the current detection correcting section shown in FIG. 6.

The current correction program 25 is constructed to calculate a corrected current value IPM from the detected peak current value ISP, as flowcharted in FIG. 7. Once a detected peak current value ISP is input from the peak current value detection section 120 to the current detection correcting section 20 at step ST20, the CPU 21 searches the current correction table 23 for an average motor current value Ia corresponding to the input detected peak current value ISP at step ST21 and calculates a ratio of the detected peak current value ISP to the average motor current value Ia (SP/Ia) at step S22. If the calculated ratio (SP/Ia) is smaller than a predetermined value k, the detected peak current value ISP is output as it is, at step ST23. If, on the other hand, the calculated ratio (SP/Ia) is equal to or greater than the predetermined value k, the CPU 21 searches through the current correction table 23 for a current correcting amount D corresponding to the input detected peak current value ISP at step ST24. Then, the CPU 21 performs the arithmetic operation as indicated by Mathematical Expression (1) to calculate a corrected current value IPM at step ST 25, and it outputs the thus-calculated corrected current value IPM at step ST26. Here, the predetermined value k is set at a value close to one, e.g. "1.1", such that the steering feel is not impaired.

Namely, in the case where the current detection correcting section 20 is employed, the detected peak current value ISP is subtractively corrected only when the target motor current signal is set at a small value (i.e., a small value range) such that the ratio of the detected peak current value ISP to the average motor current value Ia (SP/Ia) exceeds the predetermined value k, and the resultant corrected current value IPM is used for the feedback control. In this case, the correction of the detected peak current value is performed only when necessary, so that appropriate correction of the detected peak current value and hence optimal feedback control of the motor current is achieved.

Whereas the embodiment has been described as performing subtractive motor current correction using the current correction table storing current correcting amounts each obtained by subtracting an average motor current value from a corresponding detected peak current value, the present invention is not so limited. Namely, where the current correction table is one storing current correcting amounts each obtained by subtracting a detected peak current value from a corresponding average motor current value, additive motor current correction is performed instead of the subtractive motor current correction. Further, where the current correction table is one storing current correcting amounts each obtained by dividing a detected peak current value by a corresponding average motor current value, divisional motor current correction is performed instead of the subtractive or additive motor current correction. Furthermore, where the current correction table is one storing current correcting amounts each obtained by dividing a detected peak current value by dividing an average motor current value by a corresponding detected peak current value, multiplicative motor current correction is performed.

In summary, the present invention is characterized by correcting the detected peak current value and controlling the motor current using, as the feedback value, the corrected peak value that is close to the average value of the motor current. Thus, the current flowing through the steering assisting motor when the target motor current is set at a small value, i.e. the steering assisting current at the beginning of slow turning of the steering wheel during straight travel of the vehicle, can be controlled appropriately in accordance with a desired target motor current, so that an assisted steering feel can be enhanced significantly. Further, because the present invention allows a motor current, corresponding exactly to the target motor current, to flow through the steering assisting motor, it facilitates setting of an appropriate steering assist.

The present disclosure relates to the subject matter of Japanese Patent Application No. 2001-339301, filed Nov. 5, 2001, the disclosure of which is expressly incorporated herein by reference in its entirety.

What is claimed is:

1. A control method for an electric power steering apparatus, said control method comprising:

a step of detecting a peak value of a motor current flowing through a steering assisting motor whose operation is controlled on the basis of a PWM signal generated in accordance with a target motor current signal;

a step of correcting the peak value detected by said step of detecting; and a step of performing feedback control of the motor current on the basis of the peak value corrected by said step of correcting.

2. A control method as claimed in claim 1 wherein said step of correcting corrects the detected peak value to a smaller value.

3. A control method as claimed in claim 1 wherein said step of correcting corrects the detected peak value on the basis of a current correction table defining current correcting amounts.

4. A control method as claimed in claim 3 wherein the current correction table is prepared on the basis of relationship between average values of a motor current flowing through the steering assisting motor and detected peak values of the motor current.

5. A control method as claimed in claim 3 wherein said step of correcting corrects the detected peak value by searching the current correction table for a particular current correcting amount that corresponds to the detected peak value and then performing an arithmetic operation to subtract the particular current correcting amount from the detected peak value.

6. A control method as claimed in claim 1 wherein said step of correcting corrects the detected peak value only when the target motor current signal is set at a small value such that a ratio of the detected peak value to an average value of the motor current flowing through the steering assisting motor exceeds a predetermined value.

7. A control method as claimed in claim 5 wherein the current correction table is prepared on the basis of relationship between average values of a motor current flowing through the steering assisting motor and detected peak values of the motor current.

* * * * *